US009635396B2

(12) United States Patent
Wang et al.

(10) Patent No.: US 9,635,396 B2
(45) Date of Patent: Apr. 25, 2017

(54) SYSTEM AND METHOD FOR EFFICIENT SCALABLE STREAM ADAPTATION

(75) Inventors: Ye-Kui Wang, Tampere (FI); Miska M. Hannuksela, Tampere (FI)

(73) Assignee: Nokia Technologies Oy, Espoo (FI)

(*) Notice: Subject to any disclaimer, the term of this patent is extended or adjusted under 35 U.S.C. 154(b) by 2238 days.

(21) Appl. No.: 11/546,638

(22) Filed: Oct. 11, 2006

(65) Prior Publication Data

US 2007/0110150 A1   May 17, 2007

Related U.S. Application Data

(60) Provisional application No. 60/725,868, filed on Oct. 11, 2005.

(51) Int. Cl.

| H04N 21/24 | (2011.01) |
|---|---|
| H04N 21/2343 | (2011.01) |
| H04N 21/2662 | (2011.01) |
| H04N 21/845 | (2011.01) |
| H04N 21/854 | (2011.01) |
| H04N 19/70 | (2014.01) |
| H04N 19/46 | (2014.01) |
| H04N 19/61 | (2014.01) |
| H04N 19/107 | (2014.01) |
| H04N 19/31 | (2014.01) |

(52) U.S. Cl.
CPC ....... *H04N 21/2402* (2013.01); *H04N 19/107* (2014.11); *H04N 19/31* (2014.11); *H04N 19/46* (2014.11); *H04N 19/61* (2014.11); *H04N 19/70* (2014.11); *H04N 21/234327* (2013.01); *H04N 21/2662* (2013.01); *H04N 21/8455* (2013.01); *H04N 21/85406* (2013.01)

(58) Field of Classification Search
None
See application file for complete search history.

(56) References Cited

U.S. PATENT DOCUMENTS 5,742,343 A * 4/1998 Haskell .................. H04N 19/61
348/487
5,988,863 A   11/1999 Demos
(Continued)

FOREIGN PATENT DOCUMENTS

| JP | 2005516498 A1 | 6/2005 |
|---|---|---|
| JP | 2006087125 A | 3/2006 |

(Continued)

OTHER PUBLICATIONS

IEEE Transactions on Circuits and Systems for Video Technology, vol. 13, No. 7, Jul. 2003 Overview of the H.264/AVC Video Coding Standard Thomas Wiegand, Gary J. Sullivan, Senior Member, IEEE, Gisle Bjøntegaard, and Ajay Luthra, Senior Member, IEEE.*

(Continued)

*Primary Examiner* — Kevin McInnish
(74) *Attorney, Agent, or Firm* — Alston & Bird LLP

(57) ABSTRACT

A system and method for signaling low-to-high layer switching points in a file format level to enable efficient scalable stream switching in streaming servers and local file playback. The present invention also provides for a system and method for signaling low-to-high layer switching points in video bit stream, e.g., to enable intelligent forwarding of scalability layers in media-aware network elements or computationally scalable decoding in stream recipients.

10 Claims, 6 Drawing Sheets

T = temproal_level, D = dependency_id, Q = quality_level, t = time

(56) References Cited

U.S. PATENT DOCUMENTS

| | | | |
|---|---|---|---|
| 6,480,541 B1* | 11/2002 | Girod et al. | 375/240.12 |
| 6,996,173 B2* | 2/2006 | Wu et al. | 375/240.1 |
| 2003/0123546 A1* | 7/2003 | Falik et al. | 375/240.12 |
| 2004/0006575 A1 | 1/2004 | Visharam | |
| 2004/0161033 A1* | 8/2004 | Notoya et al. | 375/240.01 |
| 2004/0179619 A1* | 9/2004 | Tian et al. | 375/240.26 |
| 2005/0021814 A1* | 1/2005 | Wang | 709/231 |
| 2005/0175098 A1* | 8/2005 | Narasimhan et al. | 375/240.12 |
| 2005/0180512 A1* | 8/2005 | Narasimhan et al. | 375/240.28 |
| 2005/0231588 A1* | 10/2005 | Yang et al. | 348/14.08 |
| 2006/0088094 A1 | 4/2006 | Cieplinski et al. | |
| 2006/0120464 A1 | 6/2006 | Hannuksela | |
| 2006/0251169 A1 | 11/2006 | Wang | |
| 2007/0109409 A1* | 5/2007 | Yea et al. | 348/153 |
| 2007/0286283 A1 | 12/2007 | Yin et al. | |

FOREIGN PATENT DOCUMENTS

| | | |
|---|---|---|
| RU | 2201654 C2 | 12/1997 |
| WO | WO 03058978 A1 | 7/2003 |
| WO | WO-2006/134110 A1 | 12/2006 |

OTHER PUBLICATIONS

"The SP—and SI-Frames Design for H.264/AVC" Karcewicz, M. and Kurceren, R. IEEE Transactions on Circuits and Systems for Video Technology, vol. 13, No. 7, Jul. 2003.*

Proposal for SVC File Format Specification, ISO/IEC JTC1/SC29/WG11, MPEG2005/M12345, Jul. 2005, Poland.

Sun, Xiaoyan et al, "Seamless Switching of Scalable Video Bitstreams for Efficient Streaming", Department of Computer Application, Harbin Institute of Technology, Harbin, 15001, Microsoft Research, Asia, Beijing, pp. III-385-III-388, 2002.

Wiegand, Thomas et al., "Overview of the H.264/AVC Video Coding Standard", IEE Transactions on Circuits and Systems for Video Technology, vol. 13, No. 7, pp. 560-576, Jul. 2003.

Argyriou, Antonios et al., "Streaming H.264/AVC Video over the Internet", School of Electrical and Computer Engineering, Georgia Institute of Technology, Atlanta, GA, pp. 169-174, 2004.

Extended European Search Report for European Patent Application No. 06820789.3, dated Oct. 27, 2011.

International Search Report and Written Opinion for International Application No. PCT/IB2006/002841, mailed Feb. 28, 2007.

Girod, B., et al.; "A Scalable Codec for Internet Video Streaming"; 13th International Conference on Digital Signal Processing Proceedings; Santorini, Greece; vol. 1; Issue 2; Jul. 1997; pp. 221-224, XP010251048, DOI:10.1109/ICDSP.1997.628024; ISBN: 978-0-7803-4137-1.

Ohm J-R.; Multimedia Communication Technology; Representation, Transmission and Identification of Multimedia Signals; "13. 2.8. Scalable Hybrid Coding"; Jan. 2004; Springer; pp. 613-623; XP002660207, ISBN: 978-3-540-01249-8.

Radha, H.M., et al.; "The MPEG-4 Fine-Grained Scalable Video Coding Method for Multimedia Streaming Over IP"; IEEE Transactions on Multimedia, IEEE Service Center; Piscataway, NJ, US; vol. 3; Issue 1; Mar. 2001; pp. 53-68; XP011036234; ISSN: 1520-9210.

Reichel, J., et al.; "Scalable Video Coding—Working Draft 3"; Joint Video Team (JVT) of ISO/IEC MPEG & ITU-T VCEG; (ISO/IEC JTC1/SC29/WG11 and ITU-T SG16 Q. 6); Poland; Jul. 2005.

Richardson, Iain E.G.; "H.264 and MPEG-4 Video Compression Video Coding for Next-generation Multimedia"; John Wiley & Sons Ltd.; England; © 2003; pp. 175-176 and 225-234.

Tourapis, A.M., et al.; "H.264/MPEG-4 AVC Reference Software Manual"; Joint Video Team (JVT) of ISO/IEC MPEG & ITU-T VCEG; (ISO/IEC JTC1/SC29/WG11 and ITU-TSG16 Q. 6; Switzerland; Jul. 2007.

Visharam, M.Z., et al.; "Supporting the Storage of MPEG-21: Part 13 Scalable Video by an extension of the ISO Base Media File Format"; ISO/IEC JTC1/SC29/WG11; MPEG2004/M11422; Spain; Oct. 2004.

Wang, Y-K, et al.; "Enhancement-layer IDR (EIDR) picture"; Joint Video Team (JVT) of ISO/IEC MPEG & ITU-T VCEG; (ISO/IEC JTC1/SC29/WG11 and ITU-T SG16 Q. 6); France; Oct. 2006.

Wang, Y-K., et al.; "Proposed SVC file format working draft"; ISO/IEC JTC1/SC29/WG11; MPEG/M12370; Poland, Jul. 2005.

Wang, Y-K., et al.; "Signaling of low-to-high layer switching points in SVC file format"; ISO/IEC JTC1/SC29/WG11; MPEG M12533; France; Oct. 2005.

ITU-T; H.261; "Line Transmission of Non-Telephone Signals; Video Codec for Audiovisual Services at p×64 kbits/s"; Mar. 1993.

ITU-T; H.262; Transmission of Non-Telephone Signals; Information Technology—Generic Coding of Moving Pictures and Associated Audio Information: Video; Jul. 1995.

ITU-T; H.263; "Series H: Audiovisual and Multimedia Systems; Infrastructure of audiovisual services—Coding of moving video; Video coding for low bit rate communication"; Feb. 1998.

International Standard ISO/IEC 14496-12; "Information Technology—Coding of audio-visual objects—Part 12: ISO base media file format"; Oct. 2008.

International Standard ISO/IEC 14496-14; "Information Technology—Coding of audio-visual objects—Part 14: MP4 file format"; Nov. 2003.

International Standard ISO/IEC 14496-15; "Information Technology—Coding of audio-visual objects—Part 15: Advanced Video Coding (AVC) file format"; Apr. 2004.

Official Action (Enquiry) for Russian Patent Application No. 2008113747/09; dated Mar. 2, 2009.

Office Action for U.S. Appl. No. 13/197,672 dated Oct. 19, 2012.

Office Action for Japanese Application No. 2011-138904 dated Dec. 24, 2012.

Van Der Schaar, M., et al.; "*A Hybrid Temporal-SNR Fine-Granular Scalability for Internet Video;*" IEEE Transactions on Circuits and Systems for Video Technology, vol. 11, No. 3; pp. 318-331; dated Mar. 2001.

* cited by examiner

SYSTEM AND METHOD FOR EFFICIENT SCALABLE STREAM ADAPTATION

CROSS REFERENCE TO RELATED APPLICATIONS

This application is an application claiming the benefit under 35 USC 119(e) U.S. Provisional Application 60/725,868, filed Oct. 11, 2005, incorporated herein by reference in its entirety.

FIELD OF THE INVENTION

The present invention relates generally to media encoding, decoding, storage and transmission. More particularly, the present invention relates to scalable media encoding, decoding, storage and transmission.

BACKGROUND OF THE INVENTION

Multimedia applications include local playback, streaming or on-demand, conversational and broadcast/multicast services. Technologies involved in multimedia applications include, for example, media coding, storage and transmission. Media types include speech, audio, image, video, graphics and time text. Different standards have been specified for different technologies.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also know as ISO/IEC MPEG-4 AVC). In addition, new video coding standards are also being developed. For example, the development of a scalable video coding (SVC) standard is currently underway. This standard will become the scalable extension to H.264/AVC. The development of China video coding standards is also currently underway.

Scalable video coding can provide scalable video bit streams. A portion of a scalable video bit stream can be extracted and decoded with a degraded playback visual quality. A scalable video bit stream contains a non-scalable base layer and one or more enhancement layers. An enhancement layer may enhance the temporal resolution (i.e. the frame rate), the spatial resolution, or simply the quality of the video content represented by the lower layer or part thereof. In some cases, data of an enhancement layer can be truncated after a certain location, even at arbitrary positions. Each truncation position may include some additional data representing increasingly enhanced visual quality. Such scalability is referred to as fine-grained (granularity) scalability (FGS). In contrast to FGS, the scalability provided by a quality enhancement layer that does not provide fined-grained scalability is referred to as coarse-grained scalability (CGS).

The scalable layer structure in the current draft SVC standard is characterized by three variables, referred to as temporal_level, dependency_id and quality_level, that are signaled in the bit stream or can be derived according to the specification. temporal_level is used to indicate the temporal scalability or frame rate. A layer comprising pictures of a smaller temporal_level value has a smaller frame rate than a layer comprising pictures of a larger temporal_level. dependency_id is used to indicate the inter-layer coding dependency hierarchy. At any temporal location, a picture of a smaller dependency_id value may be used for inter-layer prediction for coding of a picture with a larger dependency_id value. quality_level is used to indicate FGS layer hierarchy. At any temporal location and with identical dependency_id value, an FGS picture with quality_level value equal to QL uses the FGS picture or base quality picture (i.e., the non-FGS picture when QL-1=0) with quality_level value equal to QL-1 for inter-layer prediction.

FIG. 1 shows a temporal segment of an exemplary scalable video stream with the displayed values of the three variables discussed above. It should be noted that the time values are relative, i.e. time=0 does not necessarily mean the time of the first picture in display order in the bit stream. A typical prediction reference relationship of the example is shown in FIG. 2, where solid arrows indicate the inter prediction reference relationship in the horizontal direction, and dashed block arrows indicate the inter-layer prediction reference relationship. The pointed-to instance uses the instance in the other direction for prediction reference.

As discussed herein, a layer is defined as the set of pictures having identical values of temporal_level, dependency_id and quality_level, respectively. To decode and playback an enhancement layer, typically the lower layers including the base layer should also be available, because the lower layers may be directly or indirectly used for inter-layer prediction in the coding of the enhancement layer. For example, in FIGS. 1 and 2, the pictures with (t, T, D, Q) equal to (0, 0, 0, 0) and (8, 0, 0, 0) belong to the base layer, which can be decoded independently of any enhancement layers. The picture with (t, T, D, Q) equal to (4, 1, 0, 0) belongs to an enhancement layer that doubles the frame rate of the base layer; the decoding of this layer needs the presence of the base layer pictures. The pictures with (t, T, D, Q) equal to (0, 0, 0, 1) and (8, 0, 0, 1) belong to an enhancement layer that enhances the quality and bit rate of the base layer in the FGS manner; the decoding of this layer also needs the presence of the base layer pictures.

In the H.264/AVC standard, instantaneous decoding refresh (IDR) picture is defined, as follows. A coded picture in which all slices are I or SI slices cause the decoding process to mark all reference pictures as "unused for reference" immediately after decoding the IDR picture. After the decoding of an IDR picture, all following coded pictures in decoding order can be decoded without inter prediction from any picture decoded prior to the IDR picture. The first picture of each coded video sequence is an IDR picture.

The concept of an IDR picture is also used in the current draft SVC standard, wherein the definition is applicable to pictures with identical values of dependency_id and quality_level, respectively. In other words, an IDR picture is a coded picture in which the decoding of the IDR picture and all the following coded pictures in decoding order in the same layer (i.e. with the same values of dependency_id and quality_level, respectively, as the IDR picture) can be performed without inter prediction from any picture prior to the IDR picture in decoding order in the same layer. An IDR picture causes the decoding process to mark all reference pictures in the same layer as "unused for reference" immediately after decoding the IDR picture. It should be noted that as used herein for the context of the current draft SVC standard, the term "in the same layer" means that the decoded pictures are with the same values of dependency_id and quality_level, respectively, as the IDR picture. Either all pictures with an identical value of picture order count (i.e. at the same temporal location) but different values of dependency_id or quality_level, are coded as IDR pictures, or no picture for a specific value of picture order count is coded as IDR picture. In other words, either all pictures in an access unit (including all of the pictures with an identical value of picture order count) are IDR pictures or no picture in an access unit is an IDR picture.

Available media file format standards include ISO file format (ISO/IEC 14496-12), MPEG-4 file format (ISO/IEC 14496-14), AVC file format (ISO/IEC 14496-15) and 3GPP file format (3GPP TS 26.244). The SVC file format is currently under development by ISO/IEC MPEG and can be found at MPEG N7477, "VM Study Text for Scalable Video Coding (SVC) File Format", 73$^{rd}$ ISO/IEC MPEG meeting, Poznan, Poland, July 2005, incorporated by reference herein in its entirety.

One advantage of scalable coding compared to single-layer coding is that, with scalable coding, a single stream can meet different requirements of quality, bit rate, display size etc, while with single-layer coding, multiple streams must be used. Using multiple streams costs more store space and, in simulcast, more transmission bandwidth. In streaming applications, stream adaptation is needed when the capabilities of the transmission network or recipient(s) change compared to their earlier states, e.g. a change of transmission bandwidth. Gateways and other media-aware network elements (MANEs) could also perform stream adaptation. When a scalably coded file is played "locally" (i.e., the file resides in the same device as the decoder or resides in memory connected with a fast link to the decoding device), stream adaptation may be needed if the decoder shares computational resources with some other processing. For example, if decoding is performed on a general-purpose processor running a multi-process operating system, the decoder may be able to use full computational power at one time and decode all the scalable layers. At another time, however, it may only have a subset of the processor's computational power in its use to decode a subset of the available scalable layers. The adapted stream may have a changed bit rate, frame rate, and/or video resolution. With single-layer coding, stream adaptation can be performed through stream switching or transcoding. With single scalable stream, stream adaptation can be performed through layer switching.

In scalable coding, high-to-low layer switching can be performed at any location. However, the case is different for low-to-high layer switching, since decoding of the switch-to picture in the high layer typically requires the presence in the same layer of some previous pictures in decoding order.

For the current draft SVC standard, low-to-high layer switching can be performed at an IDR access unit (including IDR pictures). However, relying on an IDR access unit either causes reduced coding efficiency due to frequent coding of IDR access units or non-prompt stream adaptation. Both of these issues are closely related to the end user experience. It is also theoretically possible to utilize the SP/SI picture coding or gradual decoding refresh technique to enable low-to-high layer switching. However, these techniques were designed for single-layer coding. Therefore, these techniques are not currently workable for scalable coding. Furthermore, even after these techniques are extended for use in scalable coding, their application will either result in additional coding constraints (in the form of equivalent to lower coding efficiency) or implementation complexity.

There is therefore a need for supporting simple and efficient low-to-high layer switching in scalable video coding. Furthermore, there is also a need for enabling the signaling of simple and efficient low-to-high layer switching in the file format level such that no parsing and analysis of the video bit stream is required to find the places for low-to-high layer switching, as parsing and analysis of stream could require complex computations.

SUMMARY OF THE INVENTION

The present invention provides for a system and method for the signaling of low-to-high layer switching points in the file format level to enable efficient scalable stream switching in streaming servers and local file playback. The present invention also discloses a system and method for the signaling of low-to-high layer switching points in the video bit stream, e.g., to enable intelligent forwarding of scalability layers in media-aware network elements or computationally scalable decoding in stream recipients.

The present invention enables simple and efficient low-to-high layer switching for scalable stream adaptation. The present invention eliminates the need for a streaming server to have to parse and analyze video bit streams extensively, which would otherwise require a significant computational and implementation burden. The present invention may be used in virtually any scalable media application.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 6:
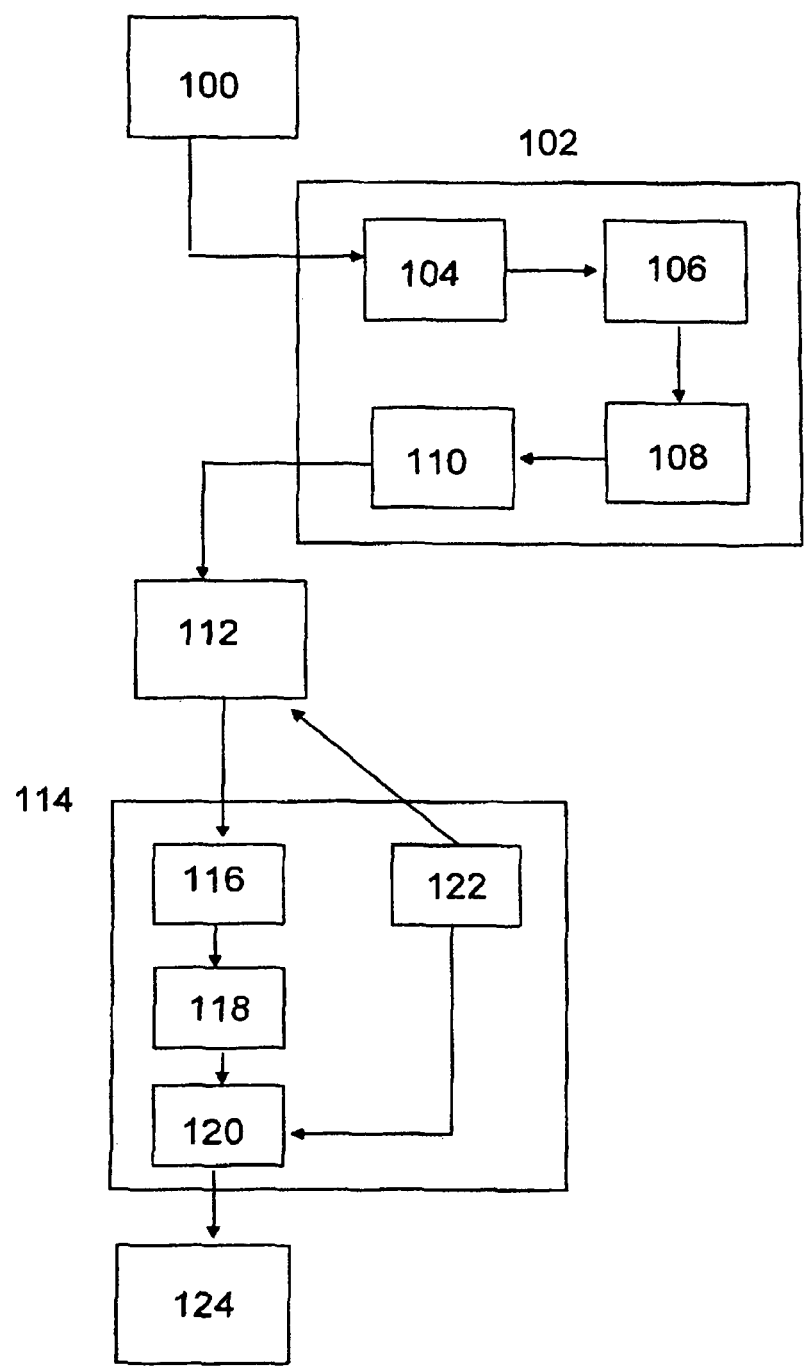
FIG. 6 is an illustration of a common multimedia data streaming system in which the scalable coding hierarchy of the invention can be applied.

With reference to FIG. 6, a typical multimedia streaming system is described, which is one system for applying the procedure of the present invention.

A multimedia data streaming system typically comprises one or more multimedia sources 100, such as a video camera and a microphone, or video image or computer graphic files stored in a memory carrier. Raw data obtained from the different multimedia sources 100 is combined into a multimedia file in an encoder 102, which can also be referred to as an editing unit. The raw data arriving from the one or more multimedia sources 100 is first captured using capturing means 104 included in the encoder 102, which capturing means can be typically implemented as different interface cards, driver software, or application software controlling the function of a card. For example, video data may be captured using a video capture card and the associated software. The output of the capturing means 104 is typically either an uncompressed or slightly compressed data flow, for example uncompressed video frames of the YUV 4:2:0 format or motion-JPEG image format, when a video capture card is concerned.

An editor 106 links different media flows together to synchronize video and audio flows to be reproduced simultaneously as desired. The editor 106 may also edit each media flow, such as a video flow, by halving the frame rate or by reducing spatial resolution, for example. The separate, although synchronized, media flows are compressed in a compressor 108, where each media flow is separately compressed using a compressor suitable for the media flow. For example, video frames of the YUV 4:2:0 format may be compressed using the ITU-T recommendation H.263 or H.264. The separate, synchronized and compressed media flows are typically interleaved in a multiplexer 110, the output obtained from the encoder 102 being a single, uniform bit flow that comprises data of a plural number of media flows and that may be referred to as a multimedia file. It is to be noted that the forming of a multimedia file does not necessarily require the multiplexing of a plural number of media flows into a single file, but the streaming server may interleave the media flows just before transmitting them.

The multimedia files are transferred to a streaming server 112, which is thus capable of carrying out the streaming either as real-time streaming or in the form of progressive downloading. In progressive downloading the multimedia files are first stored in the memory of the server 112 from where they may be retrieved for transmission as need arises. In real-time streaming the editor 102 transmits a continuous media flow of multimedia files to the streaming server 112, and the server 112 forwards the flow directly to a client 114. As a further option, real-time streaming may also be carried out such that the multimedia files are stored in a storage that is accessible from the server 112, from where real-time streaming can be driven and a continuous media flow of multimedia files is started as need arises. In such case, the editor 102 does not necessarily control the streaming by any means. The streaming server 112 carries out traffic shaping of the multimedia data as regards the bandwidth available or the maximum decoding and playback rate of the client 114, the streaming server being able to adjust the bit rate of the media flow for example by leaving out B-frames from the transmission or by adjusting the number of the scalability layers. Further, the streaming server 112 may modify the header fields of a multiplexed media flow to reduce their size and encapsulate the multimedia data into data packets that are suitable for transmission in the telecommunications network employed. The client 114 may typically adjust, at least to some extent, the operation of the server 112 by using a suitable control protocol. The client 114 is capable of controlling the server 112 at least in such a way that a desired multimedia file can be selected for transmission to the client, in addition to which the client is typically capable of stopping and interrupting the transmission of a multimedia file.

When the client 114 is receiving a multimedia file, the file is first supplied to a demultiplexer 116, which separates the media flows comprised by the multimedia file. The separate, compressed media flows are then supplied to a decompressor 118 where each separate media flow is decompressed by a decompressor suitable for each particular media flow. The decompressed and reconstructed media flows are supplied to a playback unit 120 where the media flows are rendered at a correct pace according to their synchronization data and supplied to presentation means 124. The actual presentation means 124 may comprise for example a computer or mobile station display, and loudspeaker means. The client 114 also typically comprises a control unit 122 that the end user can typically control through a user interface and that controls both the operation of the server, through the above-described control protocol, and the operation of the playback unit 120, on the basis of the instructions given by the end user.

It is to be noted that the transfer of multimedia files from the streaming server 112 to the client 114 takes place through a telecommunications network, the transfer path typically comprising a plural number of telecommunications network elements. It is therefore possible that there is at least some network element that can carry out traffic shaping of multimedia data with regard to the available bandwidth or the maximum decoding and playback rate of the client 114 at least partly in the same way as described above in connection with the streaming server.

The present invention provides for a system and method for the signaling of low-to-high layer switching points in the file format level to enable efficient scalable stream switching in streaming servers and local file playback. The present invention also discloses a system and method for the signaling of low-to-high layer switching points in the video bit stream, e.g., to enable intelligent forwarding of scalability layers in media-aware network elements or computationally scalable decoding in stream recipients.

A number of exemplary implementations of the present invention are described herein. It should be noted, however, that other variations of these implementations are also possible by, for example, combining subsets of the alternatives embodiments discussed herein.

A first implementation for signaling low-to-high layer switching points in the file format involves the use of signal low-to-high layer switching points as one type of scalability information. In this embodiment, a new box is defined for signaling the low-to-high layer switching points for each layer. The box is contained in the data structure containing the scalability information of each scalable layer, e.g. the ScalableLayerEntry( ) structure defined in the draft standard text of the SVC File Format. The box is defined as follows:

Box Types: 'lswp'
Container: ScalableLayerEntry
Mandatory: No
Quantity: Zero or One This box provides a compact marking of the low-to-high layer switching points for an individual layer within the stream. The table is arranged strictly in increasing order of sample number. If the layer switching point box is not present for a layer, then for that layer, there are no additional low-to-high layer switching points other than the sync samples signaled in the sync sample box or shadow sync samples signaled in the shadow sync sample box.

```
class LayerSwitchingPointBox extends Box('lswp'){
    unsigned int(32) entry_count;
    int i,j;
    for (i=0; i < entry_count; i++) {
        unsigned int(32) sample_number;
        unsigned int(8) entry_count2;
        for (j=0; j < entry_count2; j++)
            signed int(16) delta_layer_id;
    }
}
```

In this example, "entry_count" gives the number of entries in the following table. "sample_number" gives the sample number the sample whose information of low-to-high layer switching points for the current layer are signaled in the following table. "entry_count2" gives the number of entries in the following table.

"delta_layer_id" specifies the higher layer to which the stream can be switched from the current layer, or the lower layer from which the stream can be switched to the current layer, at the current sample with sample number equal to sample_number. A value equal to or greater than zero indicates that the stream can switch from the current layer to the higher layer with the layer identifier equal to (layerId+delta_layer_id+1) at the current sample. A value smaller than zero indicates that the stream can switch from the lower layer with the layer identifier equal to (layerId+delta_layer_id) to the current layer at the current sample. The layerId for each layer is found from the data structure containing the scalability information of each scalable layer.

A second implementation for signaling low-to-high layer switching points in the file format involves the signaling of low-to-high layer switching points of all layers in a dedicated box. The box is defined as follows.

Box Types: 'lswp'
Container: Sample Table Box ('stbl')
Mandatory: No
Quantity: Zero or One This box provides a compact marking of the low-to-high layer switching points for all the layers within the stream. The table is arranged strictly in increasing order of sample number. If the layer switching point box is not present, there are no additional low-to-high layer switching points other than the sync samples signaled in the sync sample box or shadow sync samples signaled in the shadow sync sample box.

```
class LayerSwitchingPointBox extends Box('lswp'){
    unsigned int(32) entry_count;
    int i,j,k;
    for (i=0; i < entry_count; i++) {
        unsigned int(32) sample_number;
        unsigned int(8) entry_count2;
        for (j=0; j < entry_count2; j++){
            unsigned int(8) layer_id;
            unsigned int(8) entry_count3;
            for (k=0; k < entry_count3; k++)
                signed int(16) delta_layer_id;
        }
    }
}
```

In this embodiment, "entry_count" gives the number of entries in the following table. "sample_number" gives the sample number the sample for which the information of low-to-high layer switching points is signaled in the following table. "entry_count2" gives the number of entries in the following table. "layer_id" gives the layer identifier of the layer for which the information of low-to-high layer switching points is signaled in the following table. "entry_count3" gives the number of entries in the following table.

"delta_layer_id" specifies the higher layer to which the stream can be switched from the current layer, or the lower layer from which the stream can be switched to the current layer, at the current sample with sample number equal to sample_number. A value not less than zero indicates that the stream can switch from the current layer to the higher layer with the layer identifier equal to (layer_id+delta_layer_id+1) at the current sample. A value less than zero indicates that the stream can switch from the lower layer to the current layer with the layer identifier equal to (layer_id +delta_layer_id) at the current sample. In this particular embodiment of the invention, it is also possible to put the loop of sample_number inside the loop of layer_id, instead of the current way of putting the sample_number loop inside the layer_id loop.

A third implementation for signaling low-to-high layer switching points in the file format involves the use of signaling track switching points. This embodiment may also be used simultaneously with any of the other above-identified embodiments. This embodiment applies to the case where independently-decodable combinations of scalable layers are combined to form independent tracks, typically by the use of referencing. In the ISO base media file format, the media data is represented as a set of network-independent tracks, whereas hint tracks contain network-dependent transport encapsulation information and associate media samples or portions thereof to transport packets (by references from the hint track to the media tracks). An extractor track contains references to a media track such that a subset of the coded pictures for an SVC access unit forms a sample in an extractor track. Therefore, each extractor track should represent a different subset of scalable layers, and each extractor track should be decidable without decoding other extractor tracks for the same media track.

In this particular implementation, the switching points between hint tracks or extractor tracks can be identified. Tracks that contain or refer to a sufficient subset of scalable layers enabling switching to at least one of the indicated switching point samples in this track are linked to this track by a track reference of type 'tswf' in the track reference container box. Tracks for which this track contains a sufficient subset of the scalable layers enabling switching to at least one of the indicated switching point samples in those tracks are linked to this track by a track reference of type 'tswt' in the track reference container box.

Box Type: 'tswd'
Container: Sample Table Box 'stbl'
Mandatory: No
Quantity: Zero or exactly one.

This box provides a compact marking of the low-to-high layer switching points between hint tracks or extractor tracks. The table is arranged strictly in increasing order of sample number. If the track switching point box is not present, then there are no additional low-to-high layer switching points other than the sync samples signaled in the sync sample box or shadow sync samples signaled in the shadow sync sample box.

```
class TrackSwitchingPointBox extends Box('tswp'){
    unsigned int(32) entry_count;
    int i,j;
    for (i=0; i < entry_count; i++) {
        unsigned int(32) sample_number;
        unsigned int(8) entry_count2;
        for (j=0; j < entry_count2; j++)
            unsigned int(32) src_track_id;
        unsigned int(8) entry_count3;
        for (j=0; j < entry_count3; j++)
            unsigned int(32) dest_track_id;
    }
}
```

In this scenario, "entry_count" gives the number of entries in the following table. "sample_number" gives the sample number of the switch-point sample. "entry_count2" gives the number of entries in the following table. "src_track id" indicates the track identifier of the track containing the lower layer from which the stream can be switched to the layer contained in the current track. "entry_count3" gives the number of entries in the following table. "dest_track_id" indicates the track identifier of the track containing the higher layer to which the stream can be switched from the layer contained in the current track.

It should be noted that alternative syntax definitions are also possible. For example, the entry_count3 and the related loop for values of dest_track_id can be omitted. Moreover, no loop for values of src_track_id are necessary if only one track is indicated in the 'tswf' track reference. It is also possible to use the TrackSwitchingPointBox syntax independently without the track references 'tswf' and/or 'tswt'. Furthermore, it is possible to reuse the information signaled in the media track using the first or the second alternative to obtain the low-to-high layer switching points in hint or extractor tracks, wherein the layer identifier is signaled for each hint or extractor track, e.g. in the track header or the sample entry.

The following is a discussion of alternative methods for the signaling of low-to-high layer switching points in the bit stream. A first such alternative involves the use of a new Network Abstraction Layer (NAL) unit type to indicate that a picture containing coded slices of that NAL unit type is an enhancement-layer instantaneous decoding refresh (EIDR) picture. An EIDR picture is a coded picture in which the decoding of the EIDR picture and all of the following coded pictures in decoding order in the same layer (i.e. with the same values of temporal_level, dependency_id and quality_level, respectively, as the EIDR picture) can be performed without inter prediction from any picture prior to the EIDR picture in decoding order in the same layer. An EIDR picture causes the decoding process to mark all reference pictures in the same layer as "unused for reference" immediately after decoding the EIDR picture. An EIDR picture will not have temporal_level, dependency_id and quality_level all equal to zero. It should be noted that, as used herein with the context of this alternative, "in the same layer" means that the decoded pictures are with the same values of temporal_level, dependency_id and quality_level, respectively, as the EIDR picture. It should be noted that the difference in the concept of being in the same layer compared to the latest draft SVC standard is that temporal_level is taken into account herein. By taking the temporal_level into account, low-to-high layer switching from a layer with a lower frame rate to a layer with a higher frame rate is enabled. Furthermore, the coding efficiency of the EIDR picture is improved, since reference pictures with higher values of temporal_level are automatically removed from the reference picture lists, such that some reference picture list reordering commands are saved or the values of the reference picture indices gets smaller, which improves the coding efficiency of entropy coding.

Because a lower layer cannot be dependent on a higher layer by nature of scalable coding, an EIDR picture cannot be predicted from a picture in the same layer and higher layers, but it can still be predicted from pictures from lower layers, including temporally lower layers. This enables layer switching from the next lower layer to the layer containing the EIDR picture at the location of the EIDR picture. For example, the new NAL unit type can be defined as in the following Table 1. The value 22 is used as the new NAL unit type, and the meaning of NAL unit type 20 is changed from "Coded slice of a non-IDR picture in scalable extension" to "Coded slice of a non-IDR and non-EIDR picture in scalable extension".

TABLE 1

| nal_unit_type | Content of NAL unit and RBSP syntax structure | C |
|---|---|---|
| 0 | Unspecified | |
| 1 | Coded slice of a non-IDR picture slice_layer_without_partitioning_rbsp( ) | 2, 3, 4 |
| 2 | Coded slice data partition A slice_data_partition_a_layer_rbsp( ) | 2 |
| 3 | Coded slice data partition B slice_data_partition_b_layer_rbsp( ) | 3 |
| 4 | Coded slice data partition C slice_data_partition_c_layer_rbsp( ) | 4 |
| 5 | Coded slice of an IDR picture slice_layer_without_partitioning_rbsp( ) | 2, 3 |
| 6 | Supplemental enhancement information (SEI) sei_rbsp( ) | 5 |
| 7 | Sequence parameter set seq_parameter_set_rbsp( ) | 0 |
| 8 | Picture parameter set pic_parameter_set_rbsp( ) | 1 |
| 9 | Access unit delimiter access_unit_delimiter_rbsp( ) | 6 |
| 10 | End of sequence end_of_seq_rbsp( ) | 7 |
| 11 | End of stream end_of_stream_rbsp( ) | 8 |
| 12 | Filler data filler_data_rbsp( ) | 9 |
| 13 | Sequence parameter set extension seq_parameter_set_extension_rbsp( ) | 10 |
| 14 . . . 18 | Reserved | |
| 19 | Coded slice of an auxiliary coded picture without partitioning slice_layer_without_partitioning_rbsp( ) | 2, 3, 4 |
| 20 | Coded slice of a non-IDR and non-EIDR picture in scalable extension slice_layer_in_scalable_extension_rbsp( ) | 2, 3, 4 |
| 21 | Coded slice of an IDR picture in scalable extension slice_layer_in_scalable_extension_rbsp( ) | 2, 3 |
| 22 | Coded slice of an EIDR picture in scalable extension slice_layer_in_scalable_extension_rbsp( ) | 2, 3, 4 |
| 23 | Reserved | |
| 24 . . . 31 | Unspecified | |

This design is applicable to scalable layers coded using the scalable extension where temporal_level, dependency_id and quality_level are signaled. The H.264/AVC standard itself can be used to provide temporal scalability, which can be signaled using sub-sequence information SEI messages. However, in this case, temporal_level is not signaled and therefore is inferred as zero for all of the temporal scalable layers according to the current draft SVC standard. To enable efficient low-to-high layer switching between temporal layers and not to break the H.264/AVC stream compatibility, a new SEI message is used to indicate that a picture is an EIDR picture. However, by using a SEI message, the reference management functionality of EIDR picture is impossible, i.e. an EIDR picture indicated by an SEI message can be used for low-to-high layer switching, but it does not cause the decoding process to mark all of reference pictures in the same layer as "unused for reference". This is due to the fact that SEI messages are optional to standard-compliant decoders. The SEI message is specified as follows.

| EIDR picture SEI message syntax | | |
|---|---|---|
| eidr_pic( payloadSize ) { | C | Descriptor |
|    temporal_layer_num | 5 | ue(v) |
| } | | |

EIDR picture SEI message semantics. The semantics of the above is as follows. An EIDR picture SEI message, if present, is associated with a coded picture for which the temporal_level, dependency_id and quality_level are not present in the bit stream and therefore are all inferred as equal to zero. The target picture is also associated with a sub-sequence information SEI message, wherein the sub_seq_layer_num is signaled for indicating the temporal scalability hierarchy. The presence of an EIDR picture SEI message indicates that the target picture is an EIDR picture, in which the decoding of the picture and all of the following coded pictures in decoding order in the same layer (i.e. with temporal_level, dependency_id and quality_level equal to 0 and with the same value of sub_seq_layer_num as the EIDR picture) can be decoded without inter prediction from any picture in the same layer prior to the EIDR picture in decoding order.

The "temporal_layer_num" has the same semantics as the syntax element sub_seq_layer_num in sub-sequence information SEI message. The value is identical to the sub_seq_layer_num in the sub-sequence information SEI message associated with the same target picture. It is also possible to exclude the syntax element temporal_layer_num from the syntax of the SEI message. However, if this is done, the parsing of the sub-sequence information SEI message is needed to know to which temporal scalable layer the EIDR picture belongs.

A second alternative implementation for signaling low-to-high layer switching points in the bit stream involves changing the definition of the IDR picture and relaxing the constraint for coding IDR pictures. In this implementation, the IDR is changed as follows. If any of the temporal_level, dependency_id and quality_level is not equal to zero, then an IDR picture is a coded picture in which the decoding of the IDR picture and all the following coded pictures in decoding order in the same layer (i.e. with the same values of temporal_level, dependency_id and quality_level, respectively, as the IDR picture) can be performed without inter prediction from any picture prior to the IDR picture in decoding order in the same layer. Furthermore, such an IDR picture causes the decoding process to mark all reference pictures in the same layer as "unused for reference" immediately after decoding the IDR picture. Otherwise, if the temporal_level, dependency_id and quality_level are all equal to zero, an IDR picture is a coded picture in which the decoding of the IDR picture and all the following coded pictures in decoding order can be performed without inter prediction from any picture prior to the IDR picture in decoding order. Such an IDR picture causes the decoding process to mark all reference pictures as "unused for reference" immediately after decoding the IDR picture.

The constraint for coding of IDR pictures (i.e., either all pictures in an access unit are IDR pictures or no picture in an access unit is an IDR picture) is relaxed as follows. If a picture having temporal_level, dependency_id and quality_level all equal to zero is an IDR picture, then all other pictures in the same access unit are IDR pictures. Due to this relaxed constraint for the coding of IDR pictures, it is possible to have IDR pictures in enhancement layers in an access unit where the base layer picture is a non-IDR picture. As can be observed in this second alternative, when any of temporal_level, dependency_id and quality_level are not equal to zero, the IDR picture definition is the same as the EIDR picture definition in the first alternative method for the signaling of low-to-high layer switching points in the bit stream discussed above. Therefore all of the benefits of the EIDR picture are valid. The coding of an IDR picture as defined herein enables layer switching from the next lower layer to the layer containing the IDR picture at the location of the IDR picture.

This particular design is applicable to scalable layers coded using the scalable extension where the temporal_level, dependency_id and quality_level are signaled. The same method as in alternative 1 can be employed to enable efficient low-to-high layer switching between temporal layers coding using the H.264/AVC standard itself.

A third alternative implementation for signaling low-to-high layer switching points in the bit stream involves relaxing the constraint for coding IDR pictures and using SEI message for temporal scalable layers. In this alternative, the definition of IDR picture remains unchanged, but the constraint for coding IDR pictures is relaxed as follows.

If a picture having temporal_level, dependency_id and quality_level all equal to zero is an IDR picture, then all other pictures in the same access unit are IDR pictures. This relaxation enables the coding of IDR pictures capable of low-to-high layer switching between different values of dependency_id or quality_level. However, because the IDR picture definition is not changed, i.e., the temporal_level is not included in specifying a scalable layer, the problem of low-to-high layer switching between temporal layers remain unsolved.

To solve the problem of low-to-high layer switching between temporal layers, whether they are coded using the scalable extension or the H.264/AVC standard itself, the EIDR picture SEI message similar to that described for the first alternative discussed above is used to indicate that the target picture associated with the SEI message is an EIDR picture that can be used for low-to-high layer switching. Nevertheless, an EIDR picture indicated by an SEI message does not have the reference management functionality because SEI messages are optional to standard-compliant decoders.

The syntax of the SEI is the same as in the first alternative for signaling low-to-high layer switching points in the bit stream. The semantics is also the same when the target picture is coded using the H.264/AVC standard itself. When the target picture is coded using the scalable extension, the semantics is changed as follows.

The presence of an EIDR picture SEI message indicates that the target picture is an EIDR picture, in which the decoding of the picture and all the following coded pictures in decoding order in the same layer (i.e. with identical values of temporal_level, dependency_id and quality_level as the EIDR picture) can be decoded without inter prediction from any picture in the same layer prior to the EIDR picture in decoding order. "temporal_layer_num" indicates the temporal_level value of the EIDR picture. It is also possible to exclude the syntax element temporal_layer_num from the syntax of the SEI message when the EIDR picture is coded using the scalable extension.

A fourth alternative for the signaling of low-to-high layer switching points in the bit stream involves using a SEI message for all scalable layers. In this alternative, the EIDR picture SEI message is similar to the message defined in the third alternative above is used to indicate that the target picture associated with the SEI message is an EIDR picture that can be used for low-to-high layer switching. However, in this particular embodiment, the SEI message is also used to solve the problem of low-to-high layer switching between different values of dependency_id or quality_level.

Figure 1:
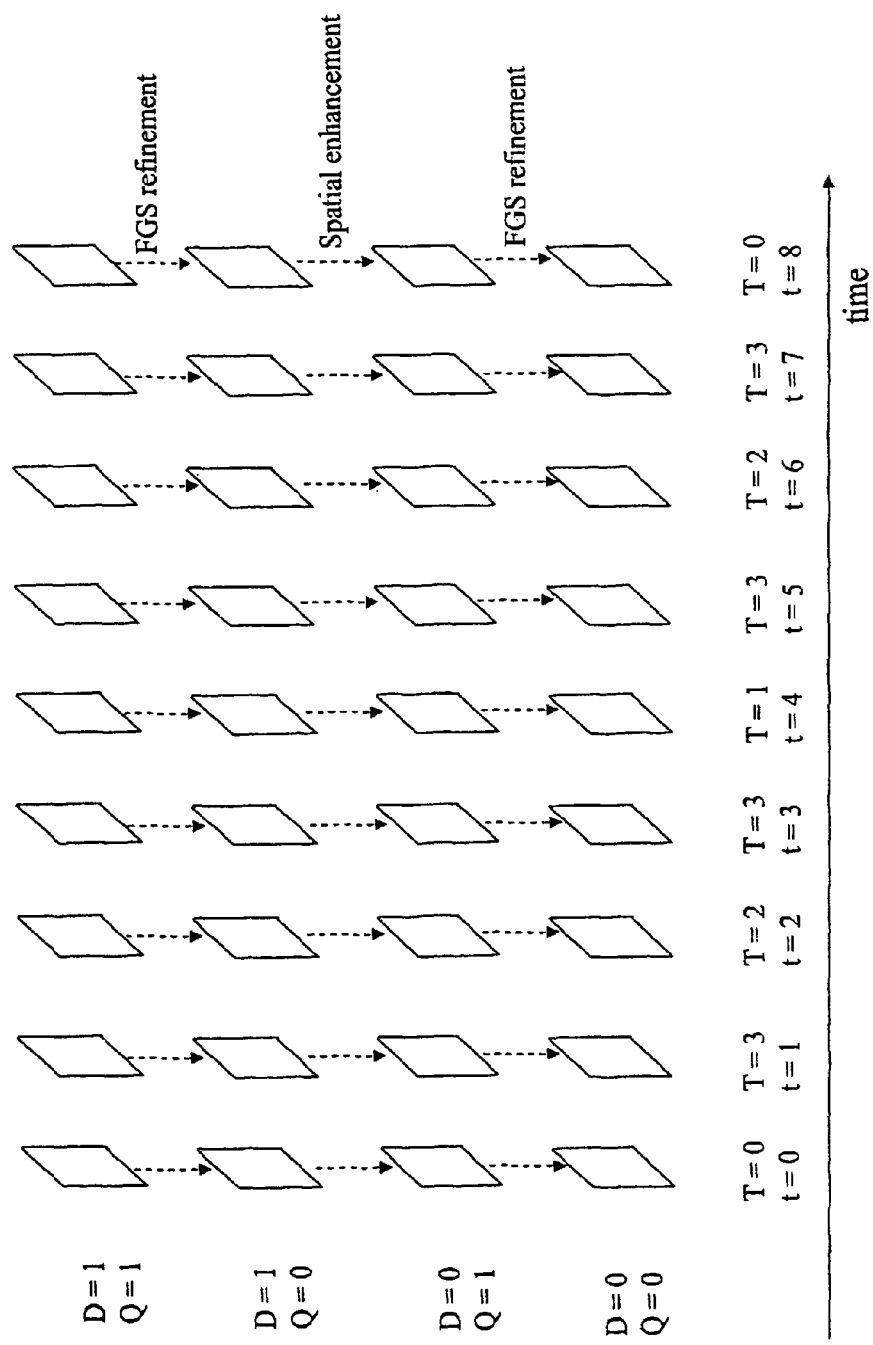
FIG. 1 shows a temporal segment of an exemplary scalable video stream with the displayed values of the three variables temporal_level, dependency_id and quality_level.
Figure 2:
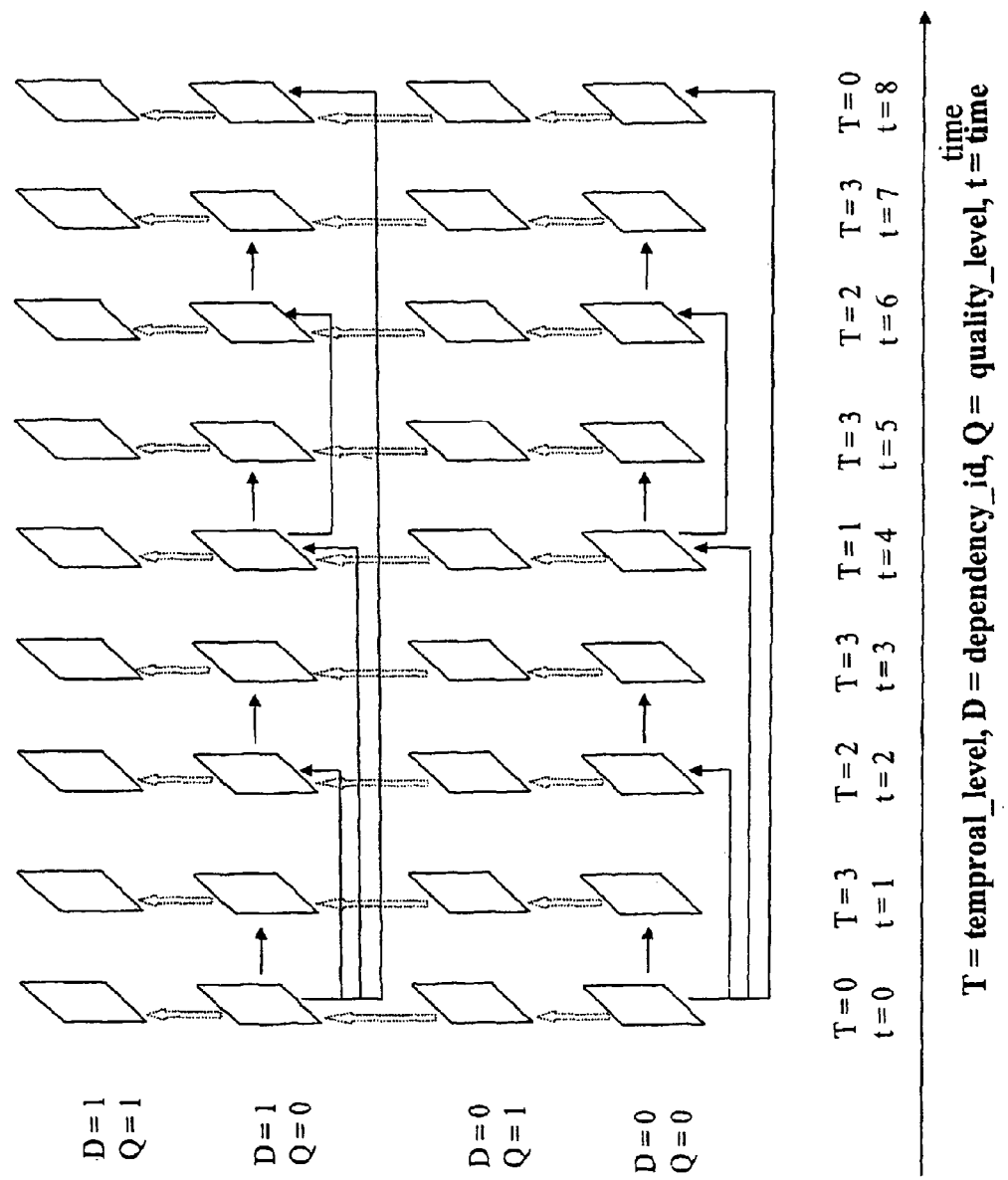
FIG. 2 is a typical prediction reference relationship for the temporal segment depicted in FIG. 1.
Figure 3:
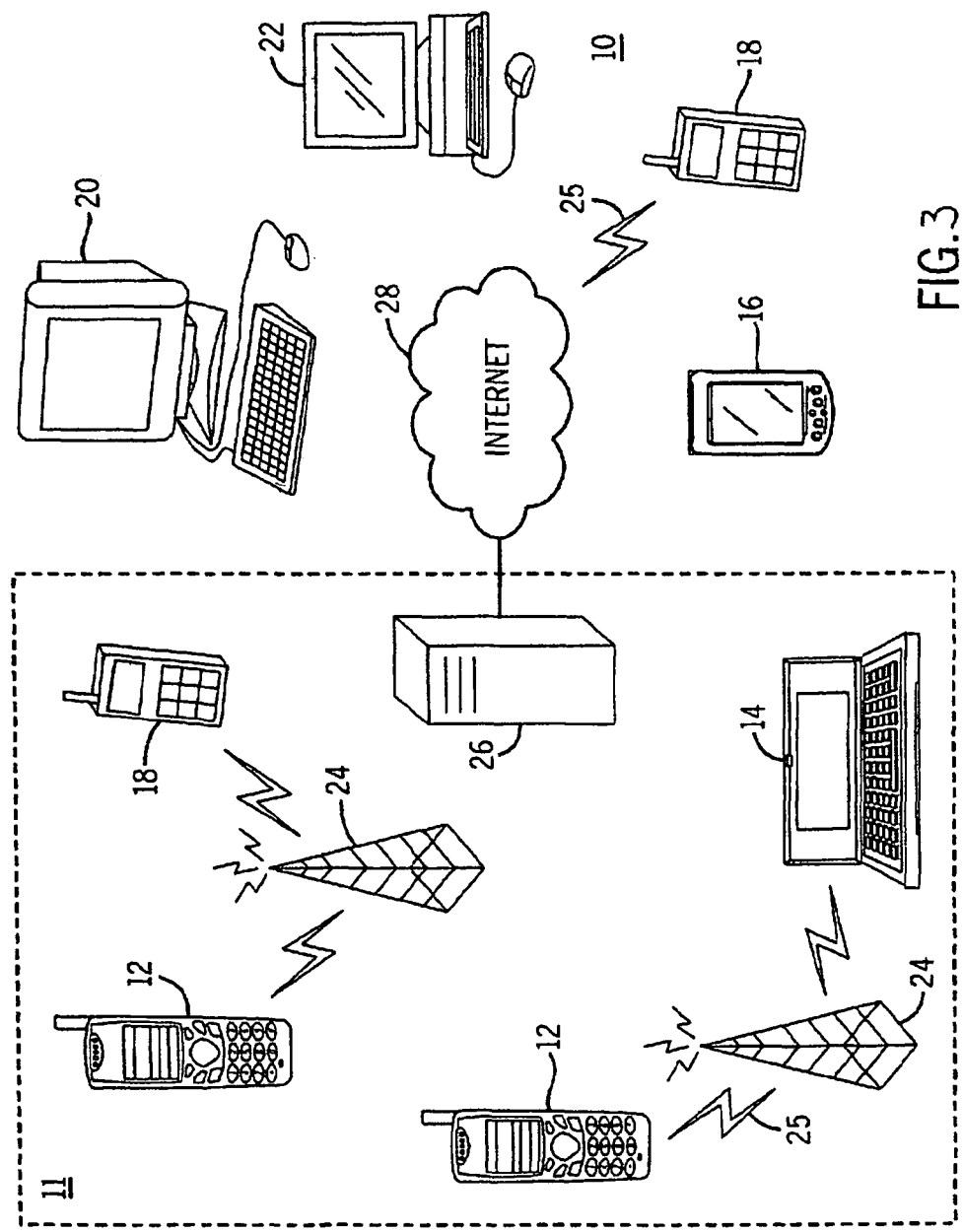
FIG. 3 is an overview diagram of a system within which the present invention may be implemented.

FIG. 3 shows a system 10 in which the present invention can be utilized, comprising multiple communication devices that can communicate through a network. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 3 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile telephone 12, a combination PDA and mobile telephone 14, a PDA 16, an integrated messaging device (IMD) 18, a desktop computer 20, and a notebook computer 22. The communication devices may be stationary or mobile as when carried by an individual who is moving. The communication devices may also be located in a mode of transportation including, but not limited to, an automobile, a truck, a taxi, a bus, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 4:
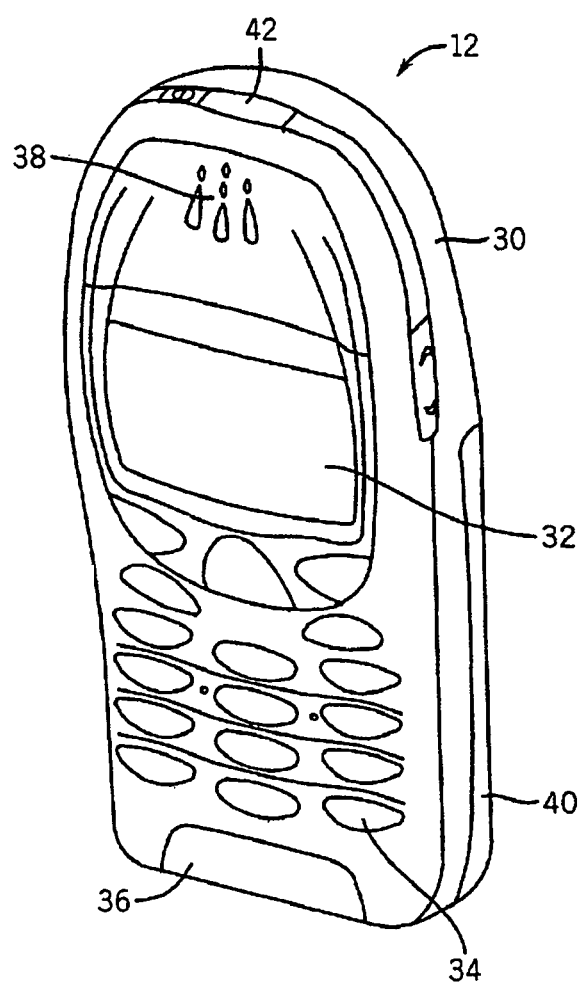
FIG. 4 is a perspective view of an electronic device that can incorporate the principles of the present invention.
Figure 5:
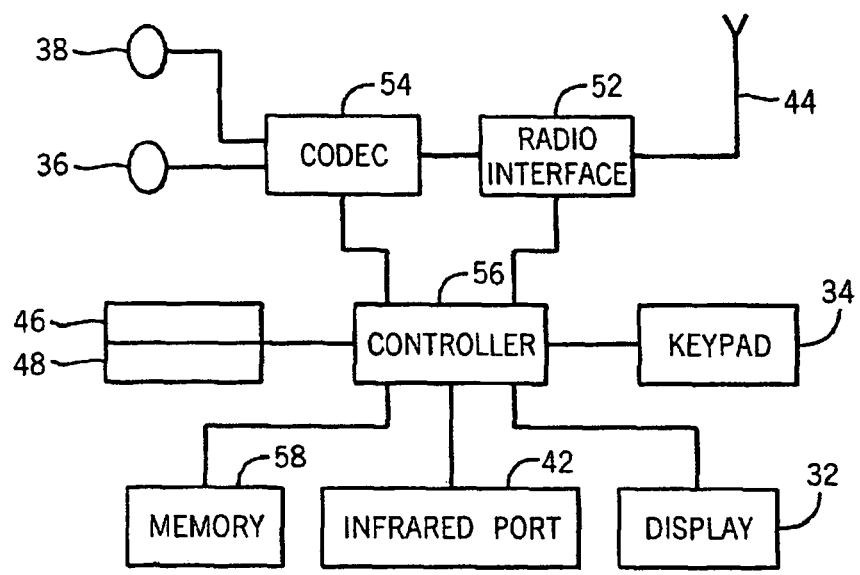
FIG. 5 is a schematic representation of the circuitry of the electronic device of FIG. 4.

FIGS. 4 and 5 show one representative mobile telephone 12 within which the present invention may be implemented. It should be understood, however, that the present invention is not intended to be limited to one particular type of mobile telephone 12 or other electronic device. The mobile telephone 12 of FIGS. 4 and 5 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of encoding a sequence of pictures into a sequence of access units, the method comprising:
encoding a first picture of the sequence of pictures into a first access unit of said sequence of access units, the first access unit comprising a non-instantaneous decoding refresh (IDR) picture in a base layer and an IDR picture in an enhancement layer, the IDR picture being decodable without inter prediction from any picture prior to the IDR picture in decoding order in the enhancement layer,
encoding at least one access unit preceding the first access unit in decoding order, the at least one access unit including at least one reference picture in the enhancement layer, and
including an indication into the sequence of access units to cause the IDR picture to mark the at least one reference picture as unused for reference.

2. A method of claim 1, further comprising:
signaling a coded layer structure for said pictures, wherein the IDR picture enhances spatial resolution or quality of the first coded picture according to the coded layer structure.

3. A method of claim 1, further comprising:
including an indication into the sequence of access units to cause the IDR picture to mark all decoded reference pictures preceding the first access unit in decoding order as unused for reference.

4. A method of claim 1, further comprising:
generating a Network Abstraction Layer (NAL) unit header for at least one NAL unit for the IDR picture to comprise said indication.

5. A method of decoding a sequence of access units into a sequence of decoded pictures, the sequence of access units including a first access unit, the first access unit comprising a non-instantaneous decoding refresh (IDR) picture in a base layer and an IDR picture in an enhancement layer, the IDR picture being decodable without inter prediction from any picture prior to the IDR picture in decoding order in the enhancement layer, the method comprising:

decoding at least one access unit preceding the first access unit in decoding order into at least one decoded reference picture in the enhancement layer, decoding the first access unit, including the IDR picture, into a first decoded reference picture, decoding an indication associated with the IDR picture, and marking, as a response to decoding the indication, the at least one decoded reference picture as unused for reference.

6. An electronic device for encoding a sequence of pictures into a sequence of access units, comprising:

a processor; and a memory unit operatively connected to the processor and including a computer program product comprising:

computer code for encoding a first picture of the sequence of pictures into a first access unit of said sequence of access units, the first access unit comprising a non-instantaneous decoding refresh (IDR) picture in a base layer and an IDR picture in an enhancement layer, the IDR picture being decodable without inter prediction from any picture prior to the IDR picture in decoding order in the enhancement layer, computer code for encoding at least one access unit preceding the first access unit in decoding order, the at least one access unit including at least one reference picture in the enhancement layer, and computer code for including an indication into the sequence of access units to cause the IDR picture to mark the at least one reference picture as unused for reference.

7. An electronic device of claim 6, further comprising:
computer code for signaling a coded layer structure for said pictures, wherein the IDR picture enhances spatial resolution or quality of the first coded picture according to the coded layer structure.

8. An electronic device of claim 6, further comprising:
computer code for including an indication into the sequence of access units to cause the IDR picture to mark all decoded reference pictures preceding the first access unit in decoding order as unused for reference.

9. An electronic device of claim 6, further comprising:
computer code for generating a Network Abstraction Layer (NAL) unit header for at least one NAL unit for the IDR picture to comprise said indication.

10. An electronic device for decoding a sequence of access units into a sequence of decoded pictures, the sequence of access units including a first access unit, the first access unit comprising a non-instantaneous decoding refresh (IDR) picture in a base layer and an IDR picture in an enhancement layer, the IDR picture being decodable without inter prediction from any picture prior to the IDR picture in decoding order in the enhancement layer, the electronic device comprising:

a processor; and a memory unit operatively connected to the processor and including a computer program product comprising:

computer code for decoding at least one access unit preceding the first access unit in decoding order into at least one decoded reference picture in the enhancement layer, computer code for decoding the first access unit, including the IDR picture, into a first decoded reference picture, computer code for decoding an indication associated with the IDR picture, and computer code for marking, as a response to decoding the indication, the at least one decoded reference picture as unused for reference.

* * * * *